United States Patent [19]
Wolf et al.

[11] Patent Number: 5,616,965
[45] Date of Patent: Apr. 1, 1997

[54] ELECTRO-PNEUMATIC BUS

[75] Inventors: Franz J. Wolf, Bad Soden-Salmünster; Uwe Reichert, Schlüchtern; Walter Decker, Windsbach; Frank Demling, Fürth; Andrew Ogrissek, Nürnberg; Dieter Feichtiger, Aidlingen; Martin Lindmayer, Sulz; Dieter Heinle, Plüderhausen, all of Germany

[73] Assignees: WOCO Franz-Josef Wolf & Co., Bad Soden-Salmünster; Alcatel SEL Aktiengesellschaft; Mercedes-Benz AG, both of Stuttgart, all of Germany

[21] Appl. No.: 448,728

[22] Filed: May 24, 1995

[30]    Foreign Application Priority Data

May 24, 1994 [DE]  Germany ............................ 44 18 055.1

[51] Int. Cl.⁶ .................................. F17D 3/00; B60L 1/00
[52] U.S. Cl. ........................ 307/10.1; 137/560; 303/15
[58] Field of Search ................................ 307/9.1, 10.1, 307/118; 137/487.5, 82, 85, 560, 883; 303/15, 16, DIG. 3; 251/129.01; 370/85.1, 85.9, 85.11; 364/424.01–424.05

[56]    References Cited

U.S. PATENT DOCUMENTS 3,895,850  7/1975  Engle et al. ........................... 303/15
4,652,057  3/1987  Engle et al. ........................... 303/15
5,369,587  11/1994 Root et al. ............................ 303/15
5,393,129  2/1995  Troiani et al. ......................... 303/15

Primary Examiner—William M. Shoop, Jr.
Assistant Examiner—Richard T. Elms
Attorney, Agent, or Firm—Lowe, Price, LeBlanc & Becker

[57]    ABSTRACT

Apparatus for controlling and adjusting an arbitrary number of adjustment units for a motor vehicle includes an electro-pneumatic bus to which are connected in arbitrary sequence, both electrically and pneumatically, all the pertinent adjusting units. The electro-pneumatic bus is composed of at least one pneumatic adjustment pressure line and of at least one electric control signal line which may contain several conductors. While reference data from a central control electronics are applied through the electric control signal line of the electro-pneumatic bus, the individual adjusting units are connected through associated valves in the pneumatic system to the pneumatic adjustment pressure line of the electro-pneumatic bus. The adjusting units preferably are designed to be modular control loops. As a result the pneumatically driven adjusting members units not only two positions, but also they may be set and controlled in quasi-analogue manner.

14 Claims, 2 Drawing Sheets

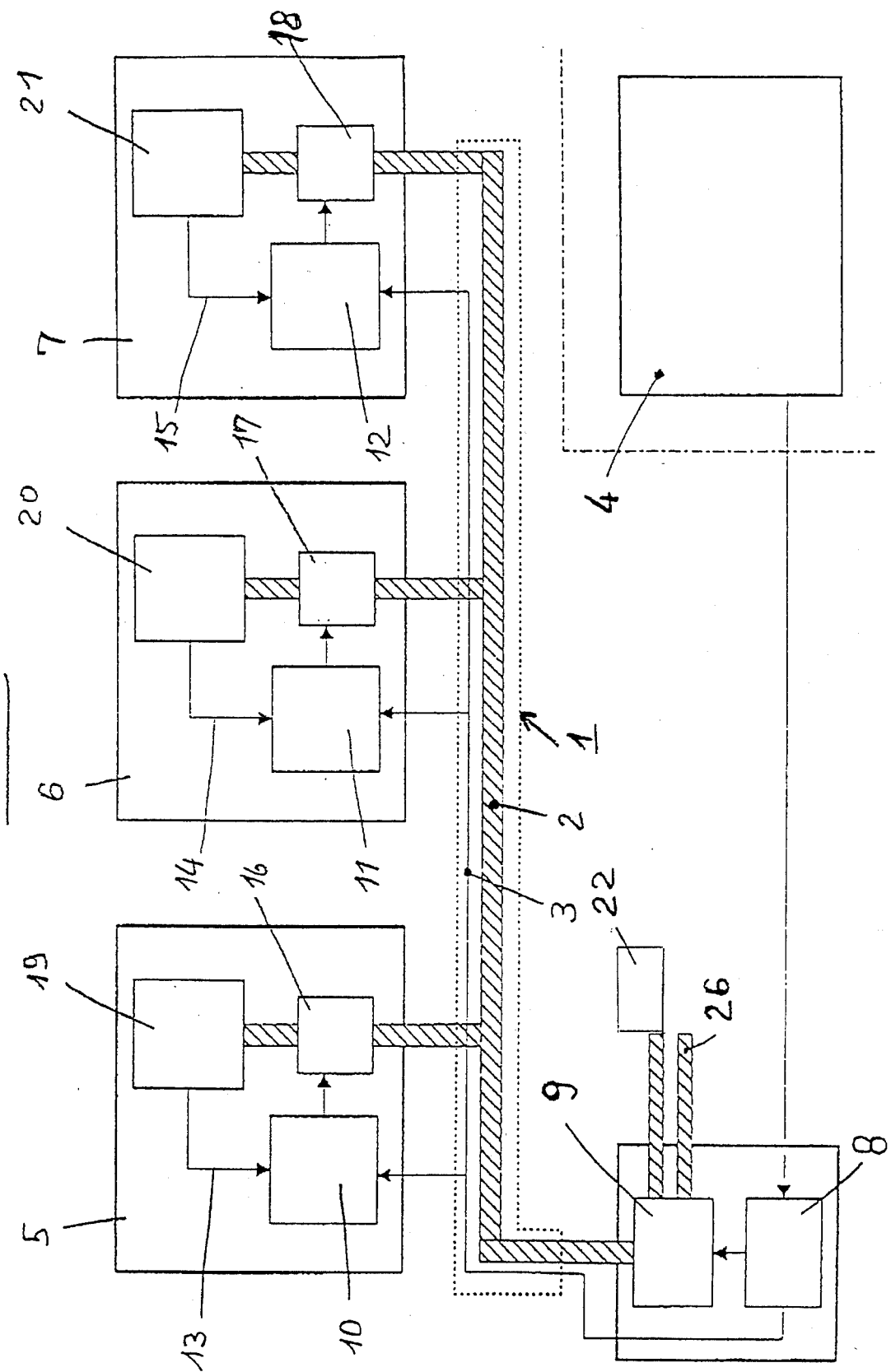

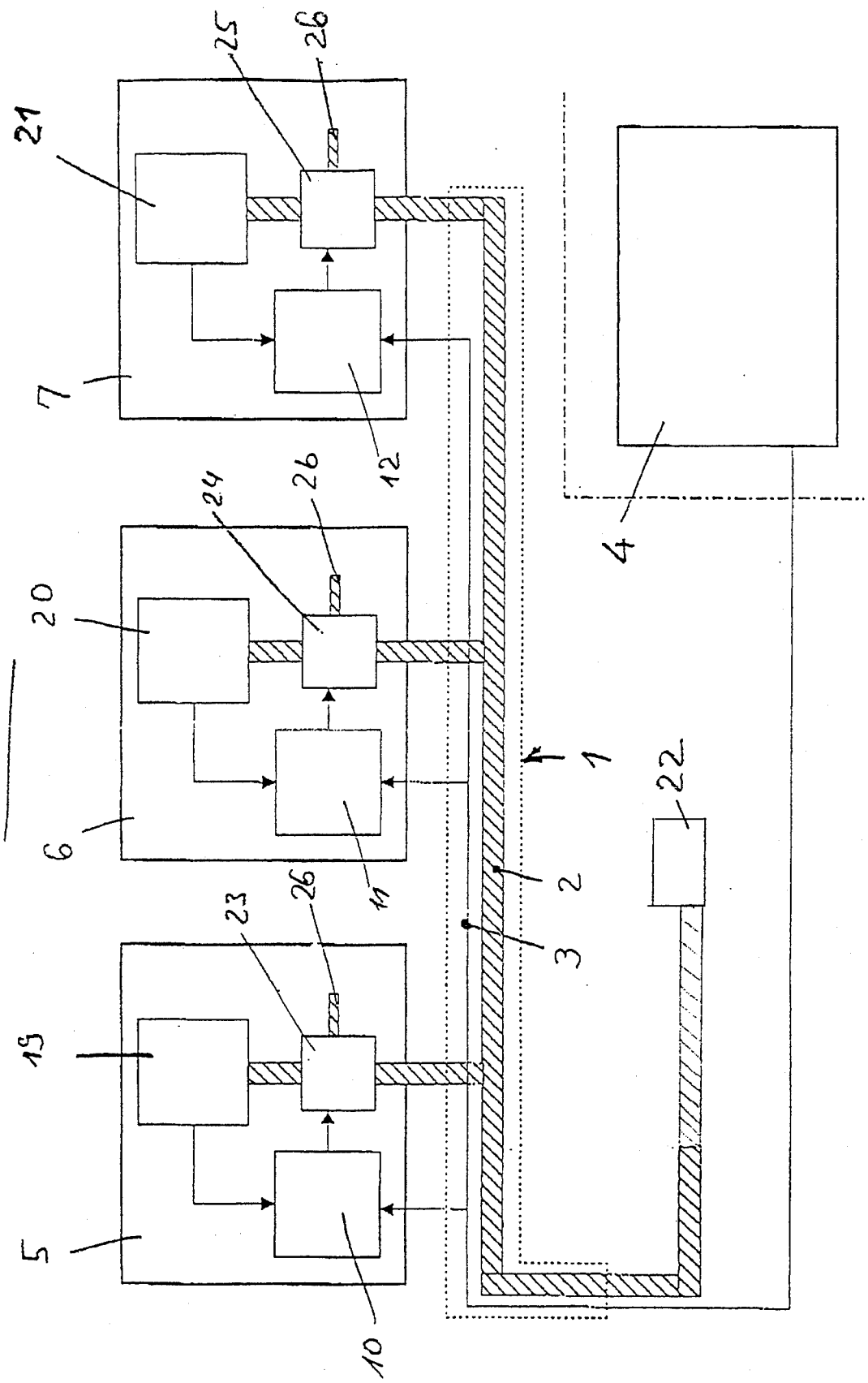

ELECTRO-PNEUMATIC BUS

BACKGROUND OF THE INVENTION

The invention relates to apparatus for controlling adjustment units and, in particular for controlling several such adjustment units.

In particular the invention concerns apparatus for controlling adjusting members and setting adjustment units in motor vehicles. Illustratively such adjustment units are flaps, sliders or valves of for many diverse kinds, illustratively car air conditioners, locks of all sorts, for instance a central locking system, or adjustment mechanisms such as headlight beam controls or seat adjustments.

Adjustment units of this sort are typically controlled and operated either pneumatically or electrically in motor vehicles.

Electric-motor driven apparatus for control and adjustment require an expensive set of components and tend to drain the electric power supply of the motor vehicle.

Pneumatically controlling and adjusting apparatus are more economical than those driven by electric motors and operate quietly and reliably. Additionally, pneumatic systems do not drain the motor vehicle power supply. However, the complex pneumatic line system entails substantial assembly work, and as a rule such apparatus can assume only two positions of the adjusting members.

The state of this art also includes a known locking system combining electric and pneumatic control-and-adjustment wherein the individual adjusting members are each fitted with electrically driven pumps which upon actuation generate the required adjustment pressure to the adjusting members. While such a design may save the assembly labor required for the pneumatic line system, it does not reduce costs or operational noise.

In the light of this state of the art, it is the object of the present invention to create an apparatus for controlling and adjusting at least one and preferably several adjusting members, particularly for motor vehicles, said apparatus being compact and demanding only little assembly work and making possible also intermediate positions using pneumatic drive means.

SUMMARY OF THE INVENTION

This problem is solved by the invention by a control and adjustment apparatus according to the present invention.

An electro-pneumatic bus is provided according to the present invention, the bus feeding all the adjusting members to be supplied. Unlike conventional pneumatic adjustment and control of the motor vehicle, individual adjusting member is no longer connected to its own, separate pneumatic line, but instead a single bus is used to which the adjusting members to be supplied are connectable at any desired location, preferably by plug-in means. This feature is implemented by an electric signal line which controls the opening or closing of the pneumatically driven adjusting members into the bus as a function of the particular adjustment requirements.

This electric control signal line of the electro-pneumatic bus may be single- or multi-conductor depending on whether the electric control signals are transmitted in series or in parallel.

Preferably, the electric control signal lines are integrated into the pneumatic adjusting pressure line such that the electric conductors are enclosed by the surface of the pneumatic adjustment pressure line, are located on it, or are fused to it. The pneumatic adjustment pressure line is preferably a plastic co-axial pipe. The integration of the electric signal lines into the pneumatic adjustment pressure line may be implemented, for instance, in the extruder during the manufacture of said pneumatic line. Alternatively, the electric signal line may be previously and separately enclosed with an electrically insulating sheath which thereupon is mounted during the extrusion of the pneumatic line onto this latter line at such a temperature that fusing takes place between the surfaces of the electric signal line and that of the pneumatic adjustment control line. In the simplest case, however, the electric control signal line may be put in place next to the pneumatic adjustment pressure line without direct physical connection between the two or only by local affixation, for instance using cable clamps, to form a functional electro-pneumatic bus.

Preferably however the electro-pneumatic bus is an integrated system and in particular, it is the plug-in kind. The plug-in feature preferably shall be such that when connecting the components forming such a connection, pneumatic and electric connections shall be simultaneous. For the case of multi-conductors in the electric control signal line, known means may be employed for such a purpose, for instance a channel-spring guide between plug and jack, and the electro-pneumatic bus can be plugged-in without difficulty with the conductors being lined up.

The individual adjusting members fed from the electro-pneumatic bus preferably are in the form of modular sets, each one with an electronic control connected to the electric control signal line of the electro-pneumatic bus, further with a valve connected to the pneumatic adjustment pressure line of said bus, a pneumatic adjustment drive loaded from the bus through said valve, and with a sensor to pick up the operational state data of the adjustment drive and/or of the adjustment member set by it and transmitting the operational state signals formed from such information to the control which generates a control signal to control the modular valve from said actual measured values and from the bus-transmitted reference values.

The electric control signal line of the electro-pneumatic bus is fed as a rule from a central control electronics transmitting the reference data for the preferably individually addressable adjustment units. The design of the pneumatic portion of the electro-pneumatic bus maybe such that the pneumatic adjustment pressure line is loaded either permanently with an adjustment pressure from an adjustment pressure source or alternatively is loaded with adjustment pressure or is vented when needed through a central valve controlled by the central control electronics. In the latter case the modular valve may be a simple 2/3 way valve, whereas for permanent adjustment pressure of the electro-pneumatic bus, the adjustment units must be designed to be vented individually by 3/3 valves.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a first embodiment of the invention with a central valve in the electro-pneumatic bus, and FIG. 2 is a second embodiment of the invention with constant partial-vacuum applied to the electro-pneumatic bus.

DETAILED DESCRIPTION OF THE PREFERRED EMBODIMENTS

The electro-pneumatic bus 1, shown in FIGS. 1 and 2, is composed of a pneumatic adjustment pressure line 2 and a multi-conductor electric control signal line 3.

The electric control signal line 3 of the electro-pneumatic bus 1 is fed from a central control electronics 4 with reference setpoint signals for the individual connected adjustment units 5, 6, 7. The central control electronics furthermore feeds control signals to the modular electronics 8 which in turn drives a central valve 9 supplying as needed the pneumatic pressure line 2 of the electro-pneumatic bus 1 with pneumatic adjustment pressure, here a partial vacuum, from an adjustment pressure source, or which connects it to the ambient atmosphere for venting.

As shown in FIG. 1, each adjustment member module 5, 6, 7 is a control loop, connected to electro-pneumatic bus 1 via plug-in connectors 30, 31, 32 . Preferably, plug-in connectors 30, 31, 32 are electro-pneumatic plugs and jacks allowing simultaneous electric and pneumatic plug-in. A module control 10, 11, 12 is connected on one hand to the electrical control signal line 3, for instance to receive and check the adjusting member address and the references values related to it, and on the other hand to an actual value signal line 13, 14, 15 transferring signals of the actual values of the adjusting member or of the adjustment drive that are sensed and transduced by a sensor 27, 28, 29. By comparing the reference values with the actual ones, the control 10, 11, 12 then forms a control signal for a 2/3 magnetic valve 16, 17, 18 integrated into the particular modular set which connects the pneumatic adjustment pressure line 2 of the electro-pneumatic bus 1 to the pneumatic adjustment drive 19, 20, 21 for the adjusting member as a function of the control data transmitted by the control. Moreover, fine control or fine adjustment of the particular adjusting members by means of the modular control circuit is also feasible.

FIG. 2 shows a variation of the bus shown in FIG. 1. Contrary to the case shown in the embodiment of FIG. 1, the pneumatic control pressure line 2 of the electro-pneumatic bus 1 is permanently connected to an adjustment pressure source 22, in this instance a partial-vacuum source. The modular valves 23, 24, 25 are magnetic 3/3 valves in the individual adjusting members 5, 6, 7 and selectively connect to the pneumatic adjustment pressure line 2 of the electro-pneumatic bus line 1 or to a venting line 26. Compared with the embodiment of an electro-pneumatic bus of the invention shown in FIG. 1, the more complex system shown in FIG. 2 allows permanent and individual adjustment and fine-control of each connected adjusting member 5, 6, 7.

Even though the above described embodiments of the invention of FIGS. 1 and 2 show merely three connected adjusting members, it is evident to the expert that the electro-pneumatic bus of the invention may be efficiently used also if a larger number—for instance 10, 20 or 30—of adjusting members are connected to such a bus.

Although the present invention has been described and illustrated in detail, it is clearly understood that the same is by way of illustration and example only and is not to be taken by way of limitation, the spirit and scope of the present being limited only by the terms of the appended claims.

What is claimed is:

1. Apparatus for controlling and adjusting at least one adjusting unit in a motor vehicle, the at least one adjusting unit being individually addressable, the apparatus comprising:

an electro-pneumatic bus connected both pneumatically and electrically to the at least one adjusting unit, the electro-pneumatic bus comprising at least one pneumatic adjustment pressure line and at least one electric control signal line transmitting data to the at least one individually addressable adjusting unit.

2. Apparatus as defined in claim 1, wherein the pneumatic adjustment pressure line is made of plastic and the at least one electric control signal line is insulated and integrated into the outer surface of the pneumatic adjustment pressure line by insertion.

3. Apparatus as defined in claim 1, wherein the electro-pneumatic bus includes four to eight integrated electric control signal lines.

4. Apparatus as defined in claim 1, wherein the an electro-pneumatic bus includes a pneumatic adjustment pressure line in the form of a coaxial pipe.

5. Apparatus as defined in claim 1, further comprising means for connecting the adjusting units to the electro-pneumatic bus, the connecting means comprising plug-in connectors to extend, seal off or branch the electro-pneumatic bus.

6. Apparatus as defined in claim 5, wherein the plug-in connectors include electro-pneumatic plugs and jacks allowing simultaneous electric and pneumatic plug-in.

7. Apparatus as defined in claim 1, wherein the apparatus controls and adjusts a plurality of adjusting units, wherein each of the plurality of adjusting units is modular and comprises:

an electronic control connectable to the electric control signal line of the electro-pneumatic bus, a valve connectable to the pneumatic adjustment pressure line of the electro-pneumatic bus, a pneumatic adjustment drive pneumatically driven from the bus through the valve, and a sensor picking up operational state data of the adjustment drive to transmit operational state signals ascertained from said operational state data to the control which generates a control signal from said operational state signals and from reference signals fed by the bus to drive the valve.

8. Apparatus as defined in claim 1, wherein the apparatus controls and adjusts a plurality of adjusting units, the apparatus further comprising central control electronics for addressing the adjusting units, individually and independently from one another, through the electric control signal line of the electro-pneumatic bus.

9. Apparatus as defined in claim 8, further comprising a central valve controlled by the central control electronics and allowing selectively to apply adjustment pressure from an adjustment pressure source to the pneumatic adjustment pressure line of the electro-pneumatic bus or to vent said line.

10. Apparatus as defined in claim 8, further comprising a pneumatic adjustment pressure source permanently loading the electro-pneumatic bus with adjustment pressure and by valves of the adjusting member module.

11. Apparatus as defined in claim 1, wherein the pneumatic adjustment pressure line is made of plastic and the at least one electric control signal line is insulated and integrated onto the outer surface of the pneumatic adjustment pressure line by fusing.

12. Apparatus as defined in claim 1, wherein the apparatus controls and adjusts a plurality of adjusting units, the apparatus further comprising central control electronics for addressing the adjusting units in sets, through the electric control signal line of the electro-pneumatic bus.

13. Apparatus as defined in claim 12, further comprising a central valve controlled by the central control electronics and allowing selectively to apply adjustment pressure from an adjustment pressure source to the pneumatic adjustment pressure line of the electro-pneumatic bus or to vent said pneumatic adjustment pressure line.

14. Apparatus as defined in claim 12, further comprising a pneumatic adjustment pressure source permanently loading the electro-pneumatic bus with adjustment pressure and by valves of the adjusting units.

* * * * *